United States Patent [19]
Willett

[11] 3,871,256  
[45] Mar. 18, 1975

[54] SUGAR CANE CONVEYOR AND CUTTER FOR CUT WINDROWED CANE

[75] Inventor: Harold A. Willett, Thibodaux, La.

[73] Assignee: Cane Machinery & Engineering Company, Inc., Thibodaux, La.

[22] Filed: May 30, 1972

[21] Appl. No.: 258,123

[52] U.S. Cl. .................................. 83/355, 83/490
[51] Int. Cl. ........................................ A01d 55/18
[58] Field of Search .................. 83/355, 356.3, 490

[56] References Cited
UNITED STATES PATENTS

| | | | |
|---|---|---|---|
| 2,297,419 | 9/1942 | Korber | 83/355 X |
| 2,723,668 | 11/1955 | Pool | 83/355 X |
| 3,773,269 | 11/1973 | Brooks et al. | 83/490 |

FOREIGN PATENTS OR APPLICATIONS

| | | | |
|---|---|---|---|
| 103,540 | 1/1942 | Sweden | 83/490 |

Primary Examiner—Willie G. Abercrombie
Attorney, Agent, or Firm—Wilkinson, Mawhinney & Theibault

[57] ABSTRACT

The present disclosure is directed to an apparatus for picking up and conveying windrowed cane, that is full length cane stalks which have been previously severed from the earth and laid with their main axes parallel to the cane rows and between two adjacent cane rows, and subjecting the stalks to a cutting action which reduces the stalk to a plurality of shorter lengths which are conveyed transversely for loading into transport vehicles at one side of the apparatus. The transverse cutter operates on the cane stalk while the stalk is moving into it so that the cutter must be mounted on a pivot arm which will permit the cutter to move in the direction of travel of the cane stalk which is at a right angle to the cutting axis of the cutter.

7 Claims, 6 Drawing Figures

SUGAR CANE CONVEYOR AND CUTTER FOR CUT WINDROWED CANE

An object of the present invention is to provide an apparatus which can be moved into a sugar cane field in which the cane has already been harvested and laid in windrows between adjacent sugar cane rows and to pick up and convey the cane stalk longitudinally into the machine along its major axis and while under the positive action of conveying the cane stalks through the machine the stalks are cut by a transverse cutting device which in one embodiment of the invention is a rotary pendulum mounted cutter which moves transversely to the longitudinal axis of the cane stalk while the cane stalk is still gripped by the positive action of the longitudinal conveyor. This causes the cutting device to be moved rearwardly of the vehicle upon which the invention is mounted so that the path of travel of the cutter will actually be a vectoral resultant of the transverse motion of the cutter and the longitudinal motion of the sugar cane stalk upon clearing the mass of stalks in the longitudinal conveyor the cutter will then drop back against the machine and make a pass in the opposite direction that is from right to left or left to right under the drive of a pitman arm which will move the rotary cutter.

A further object of the present invention is to provide an apparatus which will receive the thus cut short lengths of sugar cane stalks and convey them transversely for discharge into a transport vehicle for moving the cane from the field to the mill.

A still further object of the present invention is to provide a cane cutter for use with the device of the present invention in which hydraulically actuated cutter blades are employed on a pendulum mounted member to permit the cutting device to travel a resultant vector of the transverse cutting action on the cane stalks and the longitudinal motion of the cane stalks held captive by the moving conveyor.

With the foregoing and other objects in view the invention will be more fully described hereinafter and more particularly pointed out in the appended claims.

In the drawings in which like parts are denoted by reference characters throughout the several views:

FIG. 6 is a perspective view of a modified form of cutter employed with the pendulum arm mounted at the rear or discharge end of the longitudinal conveyor.

Figure 1:
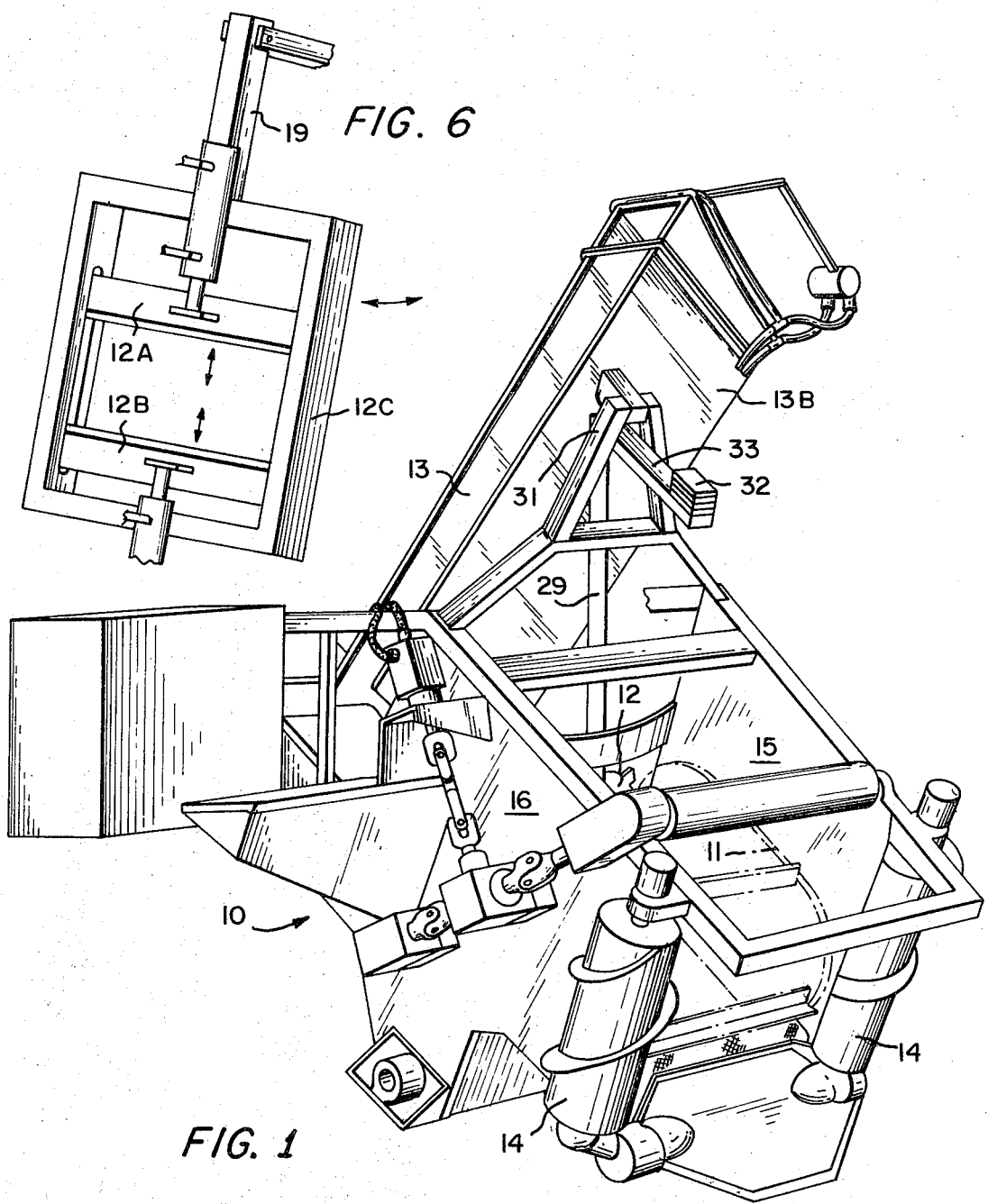
FIG. 1 is a perspective view of one form of apparatus constructed in accordance with the present invention showing the longitudinal conveyor, transverse cutter and transverse conveyor.

Referring now to FIG. 1, 10 designates the apparatus of the present invention which is mounted on a tractor of the crawler or wheel type on a frame which may be raised or lowered as shown in my U.S. Pat. No. 3,587,214. The invention comprises a longitudinal conveyor 11, a transverse cutter 12 at the upper discharge end of the conveyor 11 and a transverse conveyor 13 rearwardly of and beneath the transverse cutter 12. Hydraulically driven guide scrolls 14 are at the intake lower end of the conveyor 11.

Figure 2:
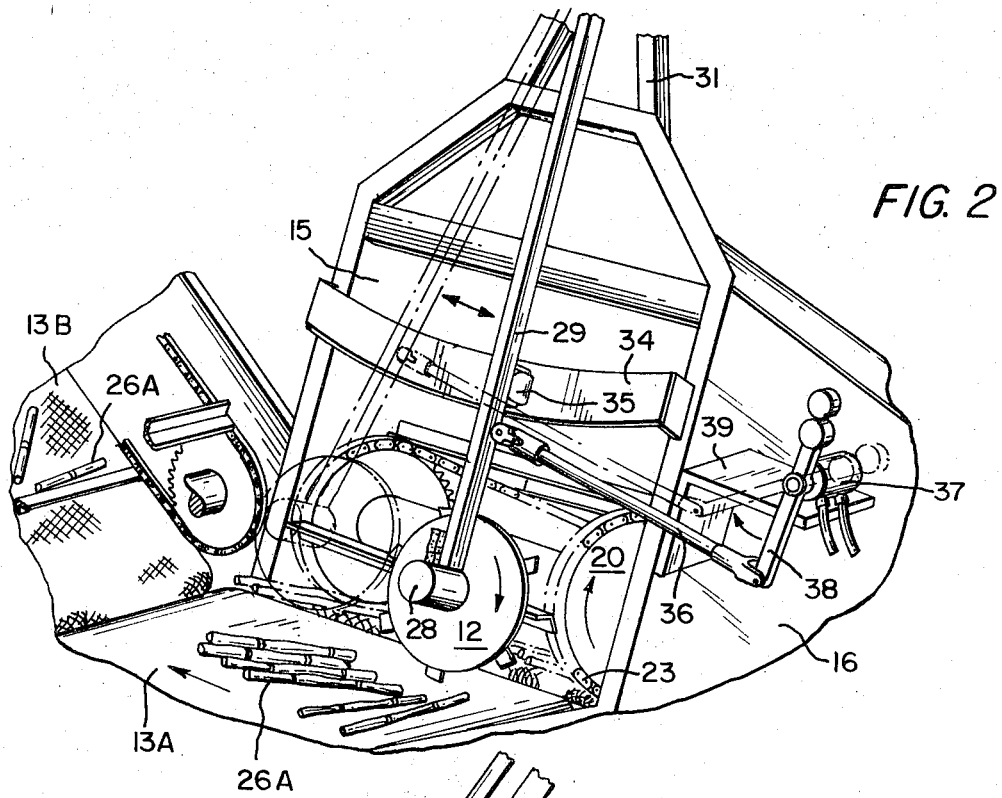
FIG. 2 is a rear perspective view of the discharge end of the longitudinal conveyor showing the path of travel of the rotary cutter and its pitman drive as well as the transverse conveyor.
Figure 3:
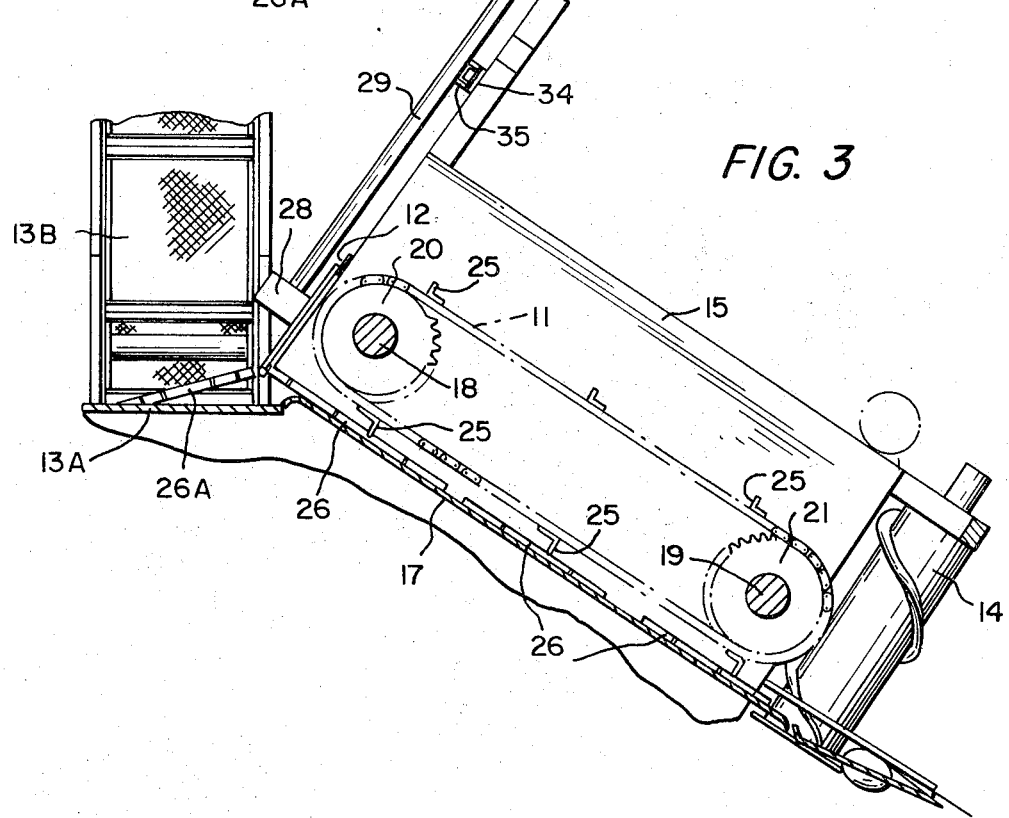
FIG. 3 is a vertical section taken through the longitudinal conveyor, transverse cutter and transverse conveyor constructed in accordance with the present invention.

Referring now to FIGS. 2 and 3, the longitudinal conveyor 11 is mounted in a trough having side walls 15, 16 and a bottom 17. A pair of shafts 18, 19 have sprockets 20, 21 secured thereto for rotation by a hydraulic motor 22. Roved about the sprockets 20, 21 are endless chains 23, 24 to which are secured angle iron cleat members 25. The scrolls 14 and a feed pick up paddle 27A directs the long cut cane stalks 26 into the mouth 27 of the longitudinal conveyor 11, and as shown in FIG. 3, the cane stalks 26 are caught between the angle iron cleats 25 and the bottom 17 and the endless chains 23, 24 move the mass of cane stalks from the lower end of the conveyor 11, lower right hand end of FIG. 3 to the upper left hand end of FIG. 3. At the top of the longitudinal conveyor 11 the transverse cutter 12 cuts the mass of stalks transversely.

Figure 4:
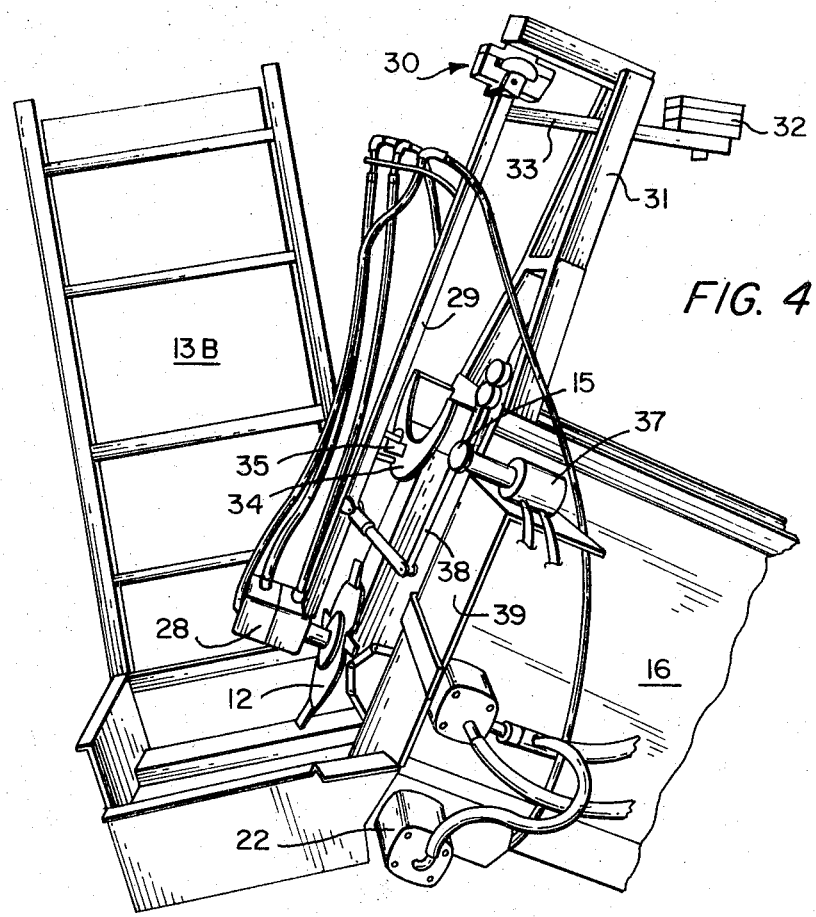
FIG. 4 is a side perspective view of the discharge end of the longitudinal conveyor showing the cutter and transverse conveyor.
Figure 5:
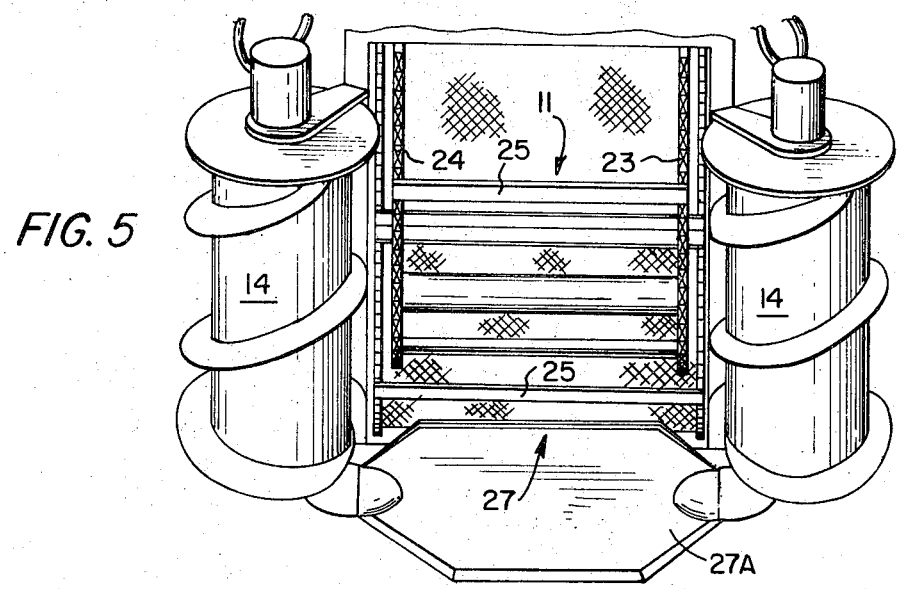
FIG. 5 is a front elevational view showing the front pick up and lower end of the longitudinal conveyor.

As best seen in FIGS. 2 and 4, the transverse cutter 12 is driven by a hydraulic rotary motor 28, mounted at the lower end of a pendulus arm 29 which is doubly universally mounted at 30 to a support brace 31 of A-frame construction. Extending off the top of the arm 29, passing through the apex of the A-frame is a counterweight 32 and its mount bracket 33. An arcuate wear plate 34 is secured across the upper end of the longitudinal conveyor 11 above the cutting disc 12 which provides a limit stop track for a guide roller 35 carried by the arm 29. The arm 29 is moved back and forth between the solid and chain line positions shown in FIG. 2 by a pitman drive arm 36 driven by a hydraulic motor 37 and crank arm 38 mounted on a support 39 secured to the side wall 16 of the longitudinal conveyor trough.

Depending upon the linear speed of the conveyor 11 and the dwell of the pitman drive which swings the arm 29 which carries the cutter blade 12 short lengths of cane stalks 26A will be cut, and as best seen in FIGS. 2 and 4, they will fall upon a transverse conveyor 13 which has a horizontal portion 13A and an upwardly inclined portion 13B for elevating the short cut stalks 26A upwardly and to one side of the machine for discharge into a transport vehicle.

All conveyor drives and the cutter are hydraulically driven from the tractors hydraulic plant under valving controls known to the art.

While I have shown one form of cane stalk incising means as a rotary cutter disc 12 in FIGS. 2 and 4 it will be appreciated that as shown in FIG. 6 a pair of quick actuating cutter blades 12A and 12B mounted in a frame 12C secured to arm 19 which is mounted for back and forth pivotal movement may be employed.

What I claim is:

1. An apparatus for picking up windrowed cane and cutting the stalks into shorter units comprising longitudinal inclined conveyor means for moving previously harvested cane stalks along their major axis, pendulously mounted cane stalk incising means positioned at the upper end of said inclined conveyor means to cut the cane stalks received at the top of said inclined conveyor into smaller units while said stalks are being moved axially along the conveyor, and transverse conveyor means positioned to receive the smaller cut stalks and convey same transversely of the apparatus.

2. An apparatus as claimed in claim 1 wherein said cane incising means is a rotary power driven cutter disc carried by a universally mounted pendulum arm driven back and forth across said longitudinal conveyor means by a pitman drive.

3. An apparatus as claimed in claim 1 wherein said cane incising means is a pair of hydraulically driven cutter blades carried by a universally mounted pendulum arm.

4. An apparatus as claimed in claim 1 wherein said pendulously mounted cane stalk incising means comprises, a pendulum arm doubly universally mounted at its upper end to said support, sugar cane stalk cutter means mounted on the lower end of said arm, an arcuate wear plate on said support, roller guide means on said pendulum arm positioned to ride in rolling contact with said wear plate, and counterweight means extending off the upper end of said arm below said double universal mount and forwardly of same.

5. A cane stalk cutter as claimed in claim 4 wherein said sugar cane stalk cutter means is a power driven rotary cutter disc.

6. A cane stalk cutter as claimed in claim 4 wherein said sugar cane stalk cutter means is a hydraulically powered cutter blade assembly.

7. A cane stalk cutter as claimed in claim 4 further comprising pitman drive means mounted on said support and connected to said pendulum for moving the cane stalk cutter back and forth across the end of said conveyor to cut the cane stalks.

* * * * *